(12) United States Patent
Snidow

(10) Patent No.: US 6,589,327 B1
(45) Date of Patent: Jul. 8, 2003

(54) ORGANIC COMPOSITE MATERIAL

(76) Inventor: Steven B. Snidow, 3425 Milton, Dallas, TX (US) 75205

( * ) Notice: Subject to any disclaimer, the term of this patent is extended or adjusted under 35 U.S.C. 154(b) by 0 days.

(21) Appl. No.: 09/701,938

(22) PCT Filed: Jun. 4, 1999

(86) PCT No.: PCT/US99/12503

§ 371 (c)(1),
(2), (4) Date: Dec. 5, 2000

(87) PCT Pub. No.: WO99/63015

PCT Pub. Date: Dec. 9, 1999

Related U.S. Application Data

(60) Provisional application No. 60/088,267, filed on Jun. 5, 1998.

(51) Int. Cl.⁷ .................. C09D 101/02; C09D 197/02
(52) U.S. Cl. ..................................... 106/162.51
(58) Field of Search .................... 106/162.51

(56) References Cited

U.S. PATENT DOCUMENTS

| | | |
|---|---|---|
| 1,553,820 A | 9/1925 | Jaeger |
| 2,306,120 A | 12/1942 | Gugger |
| 3,427,176 A | 2/1969 | Moriya |
| 3,615,721 A | 10/1971 | Silberman |
| 3,842,537 A | 10/1974 | Bishop |
| 4,014,541 A | 3/1977 | Desmarais |
| 4,045,204 A | 8/1977 | Matsunaga et al. |
| 4,306,059 A | 12/1981 | Yokobayashi et al. |
| 5,160,368 A | 11/1992 | Begovich |
| 5,344,871 A | 9/1994 | Timm et al. |
| 5,376,320 A * | 12/1994 | Tiefenbacher et al. ...... 264/232 |
| 5,389,322 A * | 2/1995 | Kim et al. .................. 264/109 |
| 5,607,983 A * | 3/1997 | Chi et al. .................... 106/122 |
| 5,620,509 A | 4/1997 | Tampio |
| 5,679,145 A | 10/1997 | Andersen et al. |
| 5,868,824 A | 2/1999 | Andersen et al. |
| 6,306,324 B1 * | 10/2001 | Wang ......................... 264/109 |
| 6,337,097 B1 * | 1/2002 | Sun et al. .................... 426/102 |

* cited by examiner

Primary Examiner—David Brunsman
(74) Attorney, Agent, or Firm—Jeffrey D. Myers

(57) ABSTRACT

A composite material comprising an organic crop cutting powder, starch, and a liquid, and a method of making molded products from the composite material. The manufactured products may be laminated or coated depending on their intended application.

18 Claims, 2 Drawing Sheets

ORGANIC COMPOSITE MATERIAL

CROSS-REFERENCE TO RELATED APPLICATIONS

This application claims the benefit of the filing of U.S. Provisional Patent Application Serial No. 60/088,267, entitled Organic Composite Material, filed on Jun. 5, 1998 and the specification thereof is incorporated herein by reference. This application is a 371 of PCT/US99/12503 filed Jun. 4, 1999.

BACKGROUND OF THE INVENTION

1. Field of the Invention (Technical Field)

The present invention relates to a composite material derived from agricultural products and agricultural by-products that can be formed or molded into various shapes.

2. Background Art

Much effort has been expended in the effort to develop an inexpensive material that has a low or positive impact on the environment, and can be used for forming various articles for industrial and consumer use. To date, none of these efforts has been entirely satisfactory.

For example, U.S. Pat. No. 5,344,871, to Timm et al., teaches the use of naturally occurring binders derived from certain agricultural products, such as proteins from cereal grasses, leguminous plants, or from leaves. Grains that have had the starch removed in the process of forming alcohol or defatted corn germ may also be used to make an organic binder. High temperatures and pressures are applied for a sufficient time to alter or denature the molecular structure of the protein resulting in polymerization. The shaping or molding process requires no chemical additives but it is useful to include sufficient amounts of water to increase heat transfer and to render the protein sufficiently flexible to flow around the materials to be bound.

U.S. Pat. No. 4,306,059, to Yokobayashi et al., teaches the use of a specific alphaglucan, termed Elsinan. Elsinan is a sugar comprised of repeating units of D-glucopyranose. An advantage of using Elsinan over other sugars, such as amylose, is that the formed products are moisture and water resistant, transparent, and storable for long periods of time without losing their desirable properties. Fillers can be mixed with the Elsinan in the range of 10,000 to 0.0001, respectively, based on dry weight. A similar sugar, Pullalan, has been used in combination with water soluble materials, such as starch, gelatin, or casein to bind chemical fertilizers in a form more suitable for application. U.S. Pat. No. 4,045,204, to Matsunaga et al.

SUMMARY OF THE INVENTION (DISCLOSURE OF THE INVENTION)

The present invention is of a composite mixture comprising an organic powder, starch, and a liquid. In the preferred embodiment, the composite mixture comprises approximately one part organic powder of particle size less than or equal to approximately 1 mm, one part starch, and two parts liquid, preferably water. The composite mixture of may also comprise fibrous organic material when an increase in strength of the inventive material is desired. The organic powder may comprise any powdered crop cuttings, but preferably straw powder.

The invention is further of a method of making a formed product from the inventive composite mixture comprising the steps of: combining an organic powder, starch and a liquid to form a slurry; pressing the slurry into a mold; heating the mold; and removing the formed product from the mold. In the preferred embodiment, the composite mixture comprises approximately one part organic powder of particle size less than or equal to approximately 1 mm, one part starch, and two parts liquid, preferably water. The composite mixture may also comprise fibrous organic material when an, increase in strength of the inventive material is desired. Once all the above materials are combined to form a slurry, the slurry is pressed into a mold and heated to an appropriate temperature, preferably at or above approximately 300° F. The organic powder may comprise any powdered crop cuttings, but preferably straw powder. After the removal of the molded product comprised of the inventive composite mixture, the molded product can.be optionally formed into a laminated structure, coated or both finishing processes may be applied. The formed product can be utilized as any disposable item for consumer use, preferably a food container.

The present invention is also of a molded product comprising an organic powder, starch, and a liquid. In the preferred embodiment, the particle size of the organic powder is less than or equal to approximately 1 mm, and the composite mixture comprises approximately one part organic powder, one part starch, and two parts liquid, preferably water.

A primary object of the present invention is to provide an inexpensive, biodegradable composite mixture that is easily shaped into various formed products. After consumption, the resulting formed products provide a positive environmental benefit compared with materials presently being utilized for similar industrial and consumer uses.

A primary advantage of the present invention is that it is comprised of relatively inexpensive and easily renewable materials.

An additional advantage of the present invention is the positive benefit it provides to the natural environment compared with other materials used for similar purposes.

Another advantage of the present invention is its ability to be molded into a rigid form. The rigid form allows for a consistent and predictable shape. Further, the strength of the resulting formed products can be adjusted to support a given load by varying the composition of the inventive composite mixture.

Still another advantage of the present invention is its heat insulation properties, its electrical insulation properties, its acoustical dampening properties, as well as its ability to hold a rigid form for an extended period.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention provides a biodegradable composite mixture and a method to make formed products of any shape from the composite mixture. The biodegradable materials of the invention include, but are not limited to, agricultural products or by-products. The inventive composite material can be formed into disposable cups, plates, flowerpots, or acoustical or building panels. After use, the material can be discarded with little or no negative environmental impact. Because the material comprises organic constituents, the material degrades with relative ease. For example, after industrial or consumer consumption the inventive material can be used as mulch in gardens or flowerbeds, or placed in a typical backyard compost pile, thus providing a positive environmental benefit. The material may be utilized for permanent solutions or for temporary solutions in industrial, consumer and post-consumer uses.

The material of the present invention comprises a mixture of starch, an organic material in powder form, and a liquid. The organic powder may also be combined with varying combinations and sizes of fiber or non-powder organic elements to meet specific design criteria for the particular application of the material. The liquid preferably comprises water, but may include alcohols, or mixtures thereof. The addition of other organic compounds, such as formaldehyde, may be also be added to the liquid where appropriate. The appropriate organic mixture, with or without added fibers, is combined with the liquid pressed into a mold, and formed into a rigid material by the application of elevated heat. The resulting product can be further modified by application of an exterior coating, such as wax or foil.

The present invention preferably combines starch, powdered straw, and water as the liquid. Other organic materials in powdered or semi-powdered form, including, such as crop cuttings or grass cuttings, may be substituted for the powdered straw. A preferred composition of the material is one part organic powder, e.g., straw powder, one part starch, and two parts water. Fibrous or other non-powder organic materials may also be added to the pre-formed composite mixture to provide additional strength to the final formed products.

Figure 1:
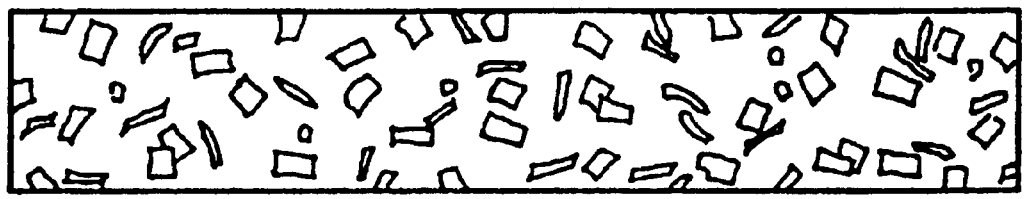
FIG. 1 represents a cross-sectional view of a material of the invention comprising a mixture of fine powder and particles of sizes of approximately 1 mm of average size.
Figure 2:
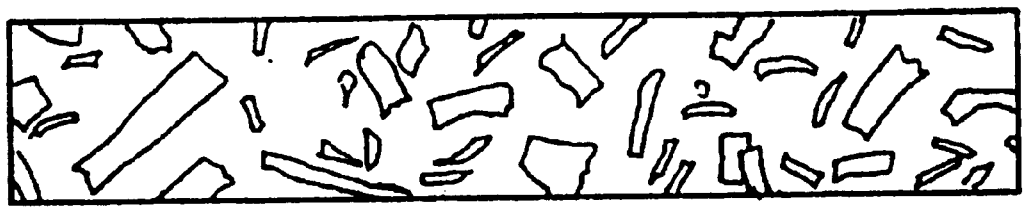
FIG. 2 represents a cross-sectional view of a material of the invention comprising a mixture of fine powder and particles of sizes not exceeding approximately 6 to 7 mm in length.
Figure 3:
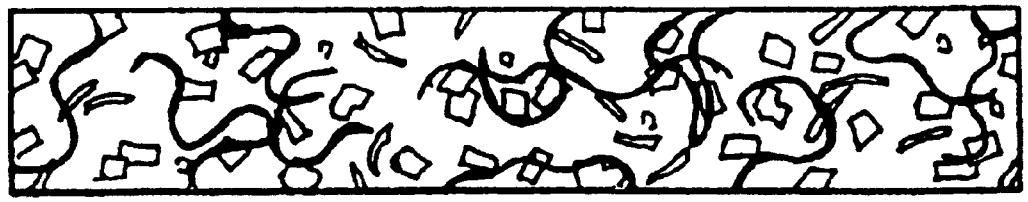
FIG. 3 represents a cross-sectional view of a material of the invention comprising a mixture of fine powder and particles of variable size and length.
Figure 4:
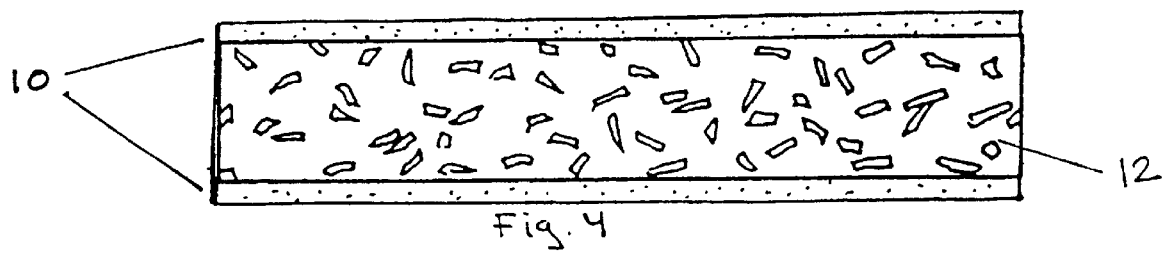
FIG. 4 represents a cross-sectional view of a material of the invention in laminate form with the two exterior surfaces of materials of the invention made from fine powders, and an interior material of the invention made from large grain powders and added fibers.

The strength of the resulting formed product is also dependent on the grain size of the organic powder. In general, the larger the grain sizes of the powder, the stronger the finished product. Utilization of a relatively fine powder in combination with the starch and water results in a finished product with a consistent appearance and a glossy sheen. The final formed product can also be manufactured as a laminate, as shown in FIG. 4.

Because the present invention results in a rigid material, the material of the invention can be used as a substitute or replacement for many other rigid materials, such as disposable cups and plates, acoustical or building panels, as well as storage, packing, and food containers. Because the final formed products derived from the inventive materials are rigid, the products can be shredded and applied as a mulch following consumption. The inventive material is subject to the same biodegradation process as any other organic material, and thus blends with the soil environment and adds nutrients to the soil following decomposition. At the consumer level, the consumed products derived from the inventive materials can be used as a compost material or mulch or other similar use. At the industrial level, the consumed products may be reclaimed or used as a composting agent.

INDUSTRIAL APPLICABILITY

The invention is further illustrated by the following non-limiting examples.

EXAMPLE 1

The material of the invention will vary in shape and thickness depending upon the desired and intended use. The material has been formed into various shapes and thickness, ranging from less than 1/8 inch to over 1/4 inch. In one example, the inventive material was formed into a plate approximately 1/8 inch in thickness. When held to a heat source of over 160° F. the formed product was shown to have an insulation value of approximately 95% of a comparable styrofoam™ product of equal thickness. In a stable and protected environment, (e.g., a dry indoor storage environment), the material has shown to be stable, not losing shape, color, or other physical characteristics over a period of 30 months.

EXAMPLE 2

The material of the invention has better sound dampening properties than that of the wood cedar. For comparison, a 90 decibel sound source was applied to both a one-quarter inch plate of cedar and a formed plate of the inventive composite material of similar thickness, the reflected sound measured was 84 and 78 decibels, respectively. The electrical resistance of the formed inventive material is similar to that of wood.

EXAMPLE 3

The present invention includes laminate materials comprising a material of the invention as a composite layer or layers. FIG. 4 represents a laminate comprising two exterior surfaces of material 10 made from fine powders, and an interior of material 12 made from larger grain powder and added fibers. The laminate can be formed by pressing the individual materials under appropriate temperatures and pressures, attaching the materials with an adhesive, or by any combination of methods known in the art.

EXAMPLE 4

Figure 5:
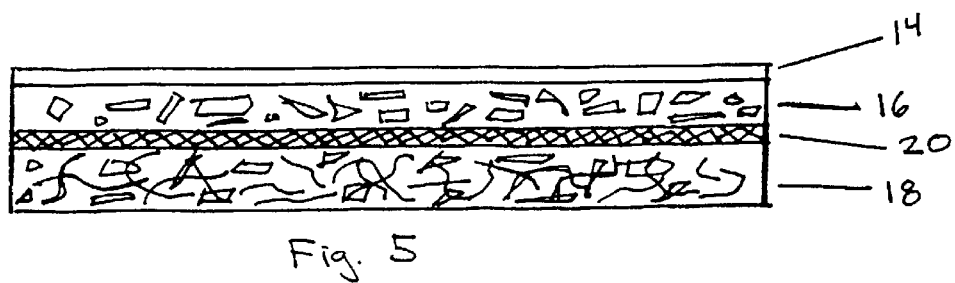
FIG. 5 represents a cross-sectional view of a material of the invention in laminate form with one exterior surface made from a material such as oak veneer, and a plurality of either inventive or non-inventive materials.

The present invention includes laminate materials comprising at least one of the materials of the invention as a composite layer. FIG. 5 represents a laminate for home paneling comprising an exterior surface of oak veneer 14, and materials of the invention 16 and 18 or other material 20. The interior material 20 can be a material such as a wood or synthetic ply, a fiber netting or cloth. The laminate can be formed by pressing the individual materials under appropriate temperatures and pressures, attaching the materials with an adhesive, or by any combination of methods known in the art.

EXAMPLE 5

Figure 6:
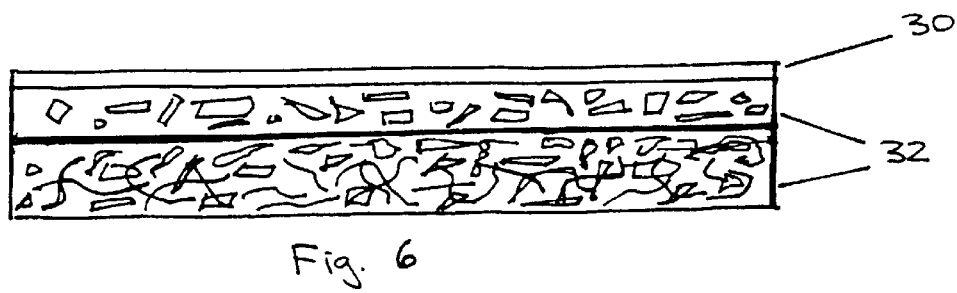
FIG. 6 represents a cross-sectional view of a material of the invention in laminate form with one exterior surface comprising wax paper, and two layers of materials of the invention.

The present invention includes laminate materials comprising at least one of the materials of the invention as a composite layer. FIG. 6 represents a laminate for consumer use such as a food container with a surface of wax paper 30, and materials of the invention 32. The laminate can be formed by pressing the individual materials under appropriate temperatures and pressures, placing the wax paper in the mold prior to injection of the present invention material (in slurry form), or by any combination of methods known in the art.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A composite mixture consisting essentially of powdered crop cuttings, starch and a liquid.

2. The composite mixture of claim 1 wherein the powdered crop cuttings are straw powder.

3. The composite mixture of claim 1 consisting essentially of approximately 1 part crop cuttings, one part starch, and two parts liquid.

4. The composite mixture of claim 1 wherein the liquid is water.

5. The composite mixture of claim 1 wherein the particle size of said powdered crop cuttings is predominately less than approximately 1 mm.

6. A method of making a formed product, the method comprising the steps of:
   a) forming a slurry consisting essentially of powdered crop cuttings, starch and a liquid;
   b) pressing or injecting said slurry into a mold;
   c) heating the mold; and
   d) removing the formed product from the mold.

7. The method according to claim 6 wherein the step of heating the mold comprising heating the mold to at or above approximately 300 degrees F.

8. The formed product made by the method of claim 7.

9. The method of claim 6 wherein the powdered crop cuttings are straw powder.

10. The formed product made by the method of claim 9.

11. The method of claim 6 consisting essentially of approximately 1 part crop cuttings, one part starch, and two parts liquid.

12. The formed product made by the method of claim 11.

13. The method of claim 6 wherein the liquid is water.

14. The formed product made by the method of claim 12.

15. The method of claim 6 wherein the particle size of said powdered crop cuttings is predominately less than approximately 1 mm.

16. The formed product made by the method of claim 15.

17. A formed product made by the method of claim 6.

18. The formed product according to claim 17 having a characteristic selected from the group consisting of a insulation value approximately equal to that of insulating foam of equal thickness, acoustical sound dampening properties similar to those of cedar wood of equal thickness, being an electrical insulator, and combinations thereof.

* * * * *